United States Patent [19]

McDonnell

[11] 4,217,719

[45] Aug. 19, 1980

[54] FISHING APPARATUS INCLUDING A COMBINED AUTOMATIC HOOKER AND LINE PROPELLING MEANS

[76] Inventor: Leo G. McDonnell, 19117 Kinloch, Detroit, Mich. 48240

[21] Appl. No.: 4,717

[22] Filed: Jan. 19, 1979

[51] Int. Cl.$^3$ ............................................. A01K 91/06
[52] U.S. Cl. ............................................ 43/15; 43/19
[58] Field of Search ........................ 43/15, 16, 19, 19.2

[56] References Cited

U.S. PATENT DOCUMENTS

| | | | |
|---|---|---|---|
| 2,628,443 | 2/1953 | Weckerling | 43/15 |
| 3,344,547 | 10/1967 | Schroeder | 43/19 |
| 3,660,921 | 5/1972 | McDonnell | 43/15 |
| 3,881,269 | 5/1975 | Timmons | 43/15 |
| 4,083,139 | 4/1978 | Schwend | 43/16 |

*Primary Examiner*—Nicholas P. Godici
*Attorney, Agent, or Firm*—Charles W. Chandler

[57] ABSTRACT

Fishing apparatus comprising a reel mounted on a tubular member, a short pilot rod pivotally connected to the tubular member, a spring housed in the tubular member and connected to the pilot rod for urging it from a first position toward a second position, and latch means for so retaining the pilot rod in the first position as to be responsive to a motion of the fish line reacting to a fish striking the lure, for jerking the line to set the hook as the pilot rod is moved toward its second position. A weight, carried on the line, can also be cast from the apparatus by mounting it on the pilot rod, pulling the pilot rod against the spring tension toward the reel, and then releasing the pilot rod.

5 Claims, 6 Drawing Figures

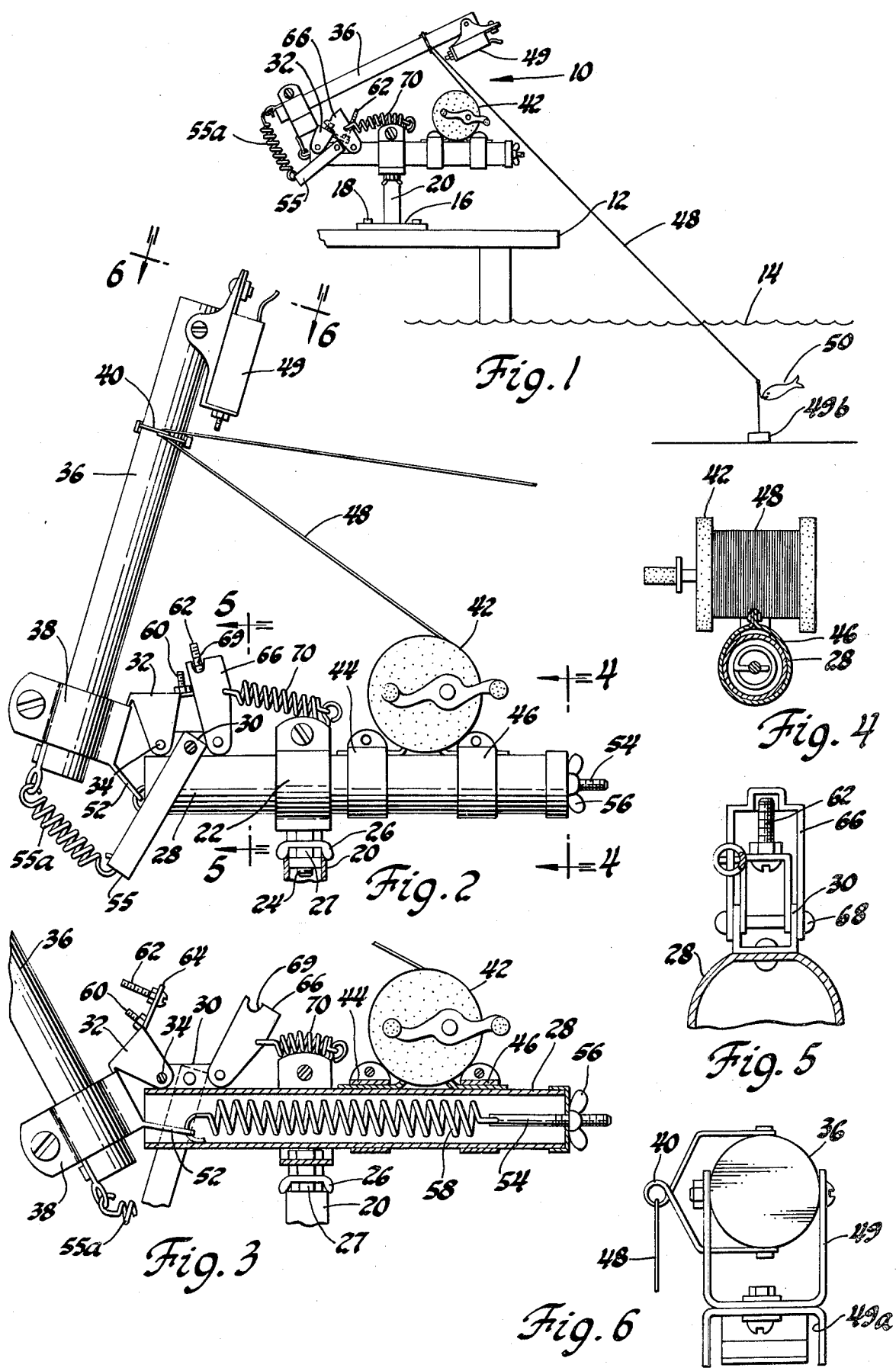

FISHING APPARATUS INCLUDING A COMBINED AUTOMATIC HOOKER AND LINE PROPELLING MEANS

BACKGROUND OF THE INVENTION

This invention is related to automatic fishing apparatus of the type in which the fish line is automatically moved in response to the motion of the lure reacting to a sharp pull by a fish, and more particularly, to such apparatus in which the reel is mounted on a tubular support and the line is guided on a pilot rod pivotally connected to the support such that the pilot rod can be employed to either jerk the lure to set the hook when a fish is being caught, or to cast the lure away from the reel.

Automatic fish rod holders are commonly employed by fishermen for fishing. The pole is automatically raised to set the hook when the fish strikes the lure.

One form of automatic fish rod holder was disclosed in any U.S. Pat. No. 3,660,921 which issued May 9, 1972, and employed a reel clamped on a conventional fish pole mounted on an upright support. A spring power member and a fluid power device cooperate to suddenly raise the fishing pole in response to a line motion resulting from the fish striking the lure.

SUMMARY OF THE INVENTION

The broad purpose of the present invention is to provide automatic fishing apparatus having a fishing reel mounted on a tubular housing, a pilot rod for supporting line unwound from the reel, pivotally connected to the tubular housing, and spring means biasing the pilot rod such that it can be employed for either casting the lure or for setting the hook in a fish attracted by the lure.

One special advantage of such an arrangement is that the fisherman does not need his own pole, but need merely mounted his reel on the tubular housing, which can be quickly clamped on the tubular spring housing.

Still other advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which:

FIG. 1 is a view illustrating the preferred apparatus employed for still fishing;

FIG. 2 is a fragmentary view showing the pilot rod in an intermediate position;

FIG. 3 is a partially sectional view illustrating the pilot rod after it has been fully released and showing the internal components of the spring-housing;

FIG. 4 is a view taken along lines 4—4 of FIG. 2;

FIG. 5 is a view taken along lines 5—5 of FIG. 2; and

FIG. 6 is a view along lines 6—6 of FIG. 2.

DESCRIPTION OF THE PREFERRED EMBODIMENT

Referring to the drawing, FIG. 1 illustrates preferred fishing apparatus generally indicated at 10 mounted on dock 12 for fishing in water 14. Fishing apparatus 10 comprises a base plate 16 attached by fastening means 18 to dock 12.

A vertical support 20 is mounted in an upright position on base plate 16. Support 20 comprises a tubular member having an opening at its upper end. A clamping member 22 carries a bolt 24 and a wing nut 26. The lower end of the bolt 24 is received through the opening in support 20, and wing nut 26 straddles a nut 27, mounted on support 20 to position tubular housing member 28 in the desired direction.

Tubular housing 28 is supported in clamping member 22 in a generally horizontal position. Housing 28 can be removed from support 20 by raising it to remove bolt 24 from the upper end of support 20.

A channel-shaped support 30 is mounted adjacent one end of housing 28. A connector 32 is mounted by pivot means 34 on channel 30. A pilot rod 36 is clamped by means 38 to connector 32 so as to be pivotally connected to housing 28.

An eye 40 is attached to the side of pilot rod 36. A conventional fishing reel 42 is mounted by clamps 44 and 46 on housing 28. A fishing line 48 has one end wound on reel 42 and an unwound portion threaded through eye 40. The unwound end of line 48 carries a fishing lure 50 which is lowered into water 14 for attracting fish.

Housing means 49 are attached to the upper end of pilot rod 36 to provide an opening 49A for receiving a weight 49B.

Referring to FIG. 3, clamping means 38 has a tab 52 received in the end of housing 28. An adjustable fastener 54 is mounted at the other end of housing 28. A wing nut 56 is mounted on the end of the housing to provide means for adjusting the position of fastener 54 and thereby the tension of spring 58 on pilot rod 36.

A coil spring 58 is disposed in the housing and has one end connected to tab 52 and its opposite end connected to fastener 54 to bias pilot rod 36 toward a fully released position illustrated in FIG. 3.

A V-shaped guard 55 is pivotally mounted on support 30 to block the open end of housing 28 and prevent the user from accidentally inserting his finger so as to be pinched with the pilot rod is being moved by spring 58. A short spring 55A connects guard 55 to the lower end of pilot rod 36 so that the guard responds to the motion of the pilot rod.

A short latch pin 60, and a longer latch pin 62 are mounted on a tab 64 carried by connector 32. The arrangement is such that latch pins 60 and 62 pivot with pole 36.

A U-shaped connector 66 is pivotally mounted by means 68 on support 30 between connector 32 and reel 42. Connector 66 has a cut-out opening 69 operative to receive latch pin 62. A spring 70 has one end connected to housing 28 adjacent reel 42 and its opposite end connected to connector 66 to bias it toward the reel.

Referring to FIG. 5, the forward upper end of connector 66 is formed to clear both latch pins. The rear end of the connector top is depressed so as to be operative to engage the upper end of both latch pins.

In operation, pilot rod 36 is pivotally movable with respect to housing 28 between three positions. In the first, forward position, illustrated in FIG. 1, connector 66 is pivoted toward the pilot rod to engage the shorter latch pin 60. In this position, connector 66 retains the pilot rod in its forward position. A sudden motion of the unwound line 48, will cause the pilot rod to pivot downward sufficiently to release pin 60 from opening 69. The pilot rod then pivots rearwardly until the second latch pin 62 is received in opening 69 as illustrated in FIGS. 2 and 5.

In this intermediate position, the pilot rod is disposed in a 60° angle with respect to the horizontal. A second downward jerk of the unwound line caused by a fish striking lure 50 is then sufficient to remove the second latch pin 62 from opening 69 thereby disconnecting the pilot rod from connector 66. The pilot rod is then moved toward its rearwardmost position by spring 58 in a sudden motion that produces an upward motion on the unwound end of line 48 to set the hook in the fish.

The purpose of the dual motion of the pilot rod is that many fish initially strike lure 50 to kill it. The initial downward motion of the line caused by the fish produces the initial upward motion of the pilot rod as it is released by pin 60. This upward motion of the pilot rod causes the lure to attract the fish which then strikes the lure a second time to swallow it. The second motion of the unwound line causes the pilot rod to remove latch pin 62 from connector opening 69 so that the pilot rod is moved toward its fully released position, illustrated in FIG. 3. As the pilot rod rises, it produces an upward motion on line 48 thereby setting the hook in the fish.

The fisherman can then remove the pole from support 20 by merely raising the apparatus to remove bolt 24 from the upper end of support 20. He removes the fish, resets latch pin 60 in connector 66 and replaces the apparatus in the upper end of the support. Bolt 24 permits the pilot rod to be swiveled to any desired position with respect to dock 12.

To use the preferred apparatus for casting lure 50, the user, preferably holding the apparatus in his hand so that the lower end of the pilot rod faces to the right, as viewed in FIG. 1, inserts weight 49B in housing 49, and pulls the pilot rod down toward reel 42 to stretch spring 58. He unwinds a sufficient length of line to accomodate a casting motion, and releases the pilot rod so that the sudden motion caused by the spring pivoting the pilot rod, causes weight 49B to fly out of housing 49, carrying lure 50 out over water 14. He then reverses the position of the apparatus to that of FIG. 1, positions latch 60 in opening 69, and positions bolt 24 in the top opening of support 20.

The upper end of the pilot rod can also be modified to support weight 49B for a casting motion thereby eliminating housing 49.

The preferred apparatus is only about twelve inches long and can easily be carried in a brief case.

Having described my invention, I claim:

1. Fishing apparatus comprising:
   a support;
   an elongated tubular housing mounted on the support;
   a fishing reel and means mounting the reel on said housing;
   a fishing line having one end wound on said reel, and an opposite unwound end;
   a pilot rod and means connecting the pilot rod to the housing for pivotal motion thereto, from a first position to a second position;
   eye means on said pilot rod for supporting said line unwound from said reel;
   latch means including a first latch member, and connector means connected to the support, said connector means being engaged by the first latch member for releasably retaining the pilot rod in said first position, and a second latch member disposed to engage the connector means to retain the pilot rod in a third pivotal position, between said first position and said second position, the connector means being responsive to a first motion of the unwound line to release the pilot rod for motion toward said third position, and being responsive to a second motion of the unwound line to release the pilot rod for a motion from said third position to said second position; and
   bias means connected to the pilot rod for urging it toward said second position in a motion operative to move the unwound end of the fishing line in a predetermined motion with respect to the reel.

2. Fishing apparatus as defined in claim 1, in which said bias means includes an elongated bias member mounted in the housing, means at one end of the housing connected to one end of the bias member, and means connecting the opposite end of the bias member to the pilot rod.

3. Fishing apparatus as defined in claim 1, in which said connector means includes a movable connector member for engaging said latch means, and a bias member connected to the connector member for urging the pilot rod, at such times as it is connected to the connector member, toward said first position.

4. Fishing apparatus as defined in claim 1, including a weight carried by the unwound line, and weight supporting means on the pilot rod for supporting the weight such that the pilot rod and said bias means are operative to cause removal of the weight from said weight supporting means by a motion of the pilot rod toward said second position.

5. Fishing apparatus as defined in claim 1, including a weight connected to the unwound end of the line, and means on the pilot rod for supporting the weight such that said bias means is operative to cause said weight to be ejected from said weight supporting means.

* * * * *